United States Patent [19]

Cockram

[11] 4,171,139

[45] Oct. 16, 1979

[54] COLLAPSIBLE PACK CART

[76] Inventor: Edwin F. Cockram, 606 NW. 99th, Vancouver, Wash. 98665

[21] Appl. No.: 903,715

[22] Filed: May 8, 1978

Related U.S. Application Data

[63] Continuation of Ser. No. 733,368, Oct. 18, 1976, abandoned.

[51] Int. Cl.² .............................................. B62B 11/00
[52] U.S. Cl. ..................................... 280/652; 280/78; 280/47.3
[58] Field of Search ............... 280/652, 653, 655, 47.3, 280/47.31, 47.32, 645, 78

[56] References Cited

U.S. PATENT DOCUMENTS

| | | | |
|---|---|---|---|
| 1,742,137 | 12/1929 | Grosse | 280/37 |
| 2,979,338 | 4/1961 | Dwyer | 280/47.3 |
| 2,992,834 | 7/1961 | Tidwell | 280/47.3 |
| 3,222,100 | 12/1965 | Lindzy | 280/652 |
| 3,860,254 | 1/1975 | Wegener | 280/652 |

*Primary Examiner*—Robert R. Song

*Attorney, Agent, or Firm*—Chernoff & Vilhauer

[57] ABSTRACT

A collapsible pack cart comprises first and second frame members pivotally joined together and movable with respect to one another between an operating position, where they are oriented perpendicular to one another, and a folded position, where they are oriented laterally side by side and separated by a spaced distance. A wheel is carried rotatably by a carriage which is mounted to the frame members releasably in either an operative position where the wheel extends substantially perpendicular to the planes of both frame members when they are in their operating position, or a storable position where it is located entirely between the frame members when they are in their folded position. Support arms are attached releasably to that frame member which carries the wheel, and handles are attached to the other frame member for manipulation of the cart. Mounting means are provided for mounting the handles and support arms releasably to one of the frame members for transportation when the cart is folded, and locking means are provided for locking the frame members in their operating position.

7 Claims, 9 Drawing Figures

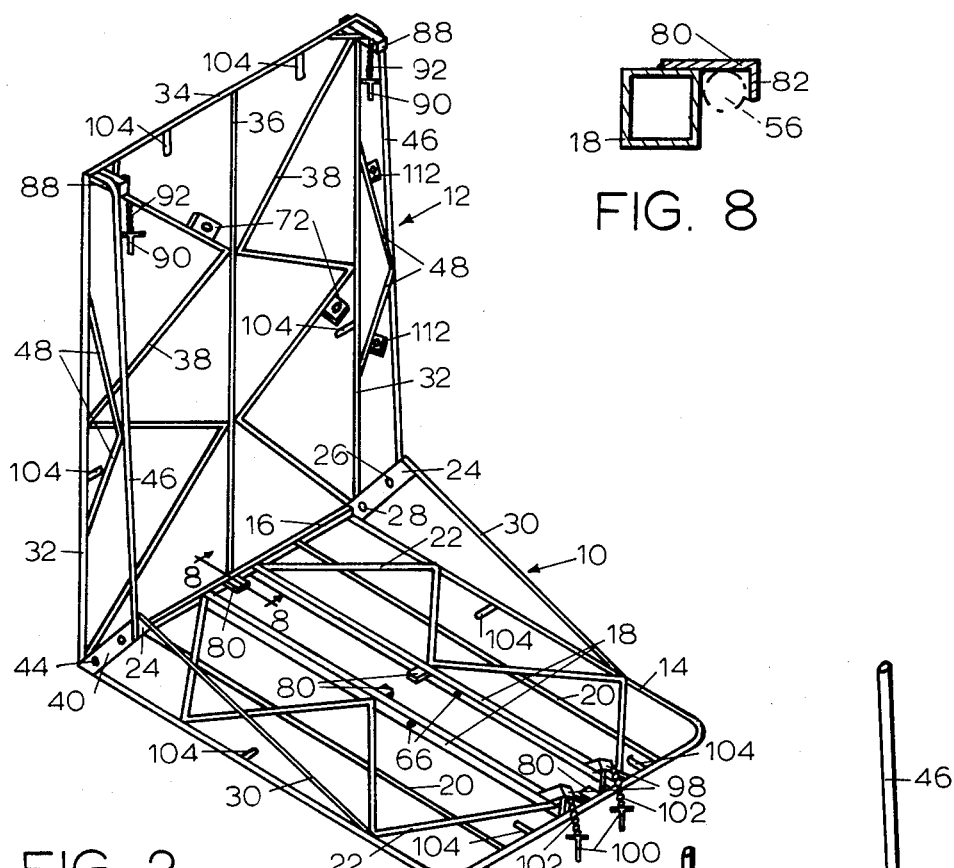
FIG. 8
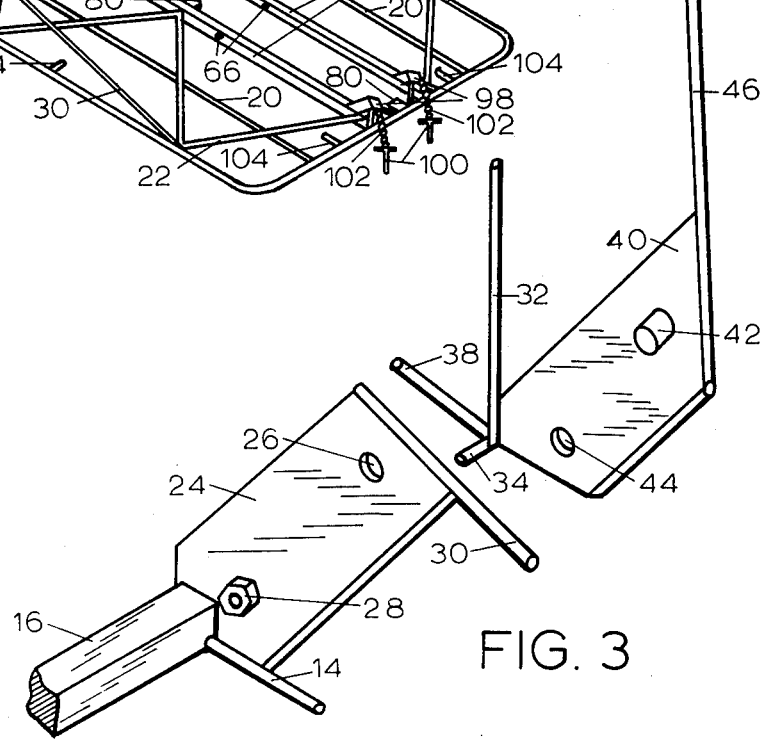
FIG. 2
FIG. 3

COLLAPSIBLE PACK CART

This is a continuation, of application Ser. No. 733,368, filed Oct. 18, 1976, now abandoned.

BACKGROUND OF THE INVENTION

This invention relates to a pack cart and more particularly to a pack cart which is collapsible to a compact, folded configuration for storage transportation.

Pack carts designed for transporting a load are well known in the prior art. Many of these carts disassemble or collapse in some manner to a more compact configuration facilitating storage and transportation.

However, the prior art collapsible pack carts are either complex, or do not collapse to a small enough package to be handled in a convenient manner. Those carts which utilize complex collapsing means are expensive to fabricate, costly to repair and difficult to operate. Those carts which do not collapse completely normally will not fit in a small space such as an automobile trunk.

SUMMARY OF THE INVENTION

In its basic concept the pack cart of this invention comprises a frame having paired folding members configured for mounting a wheel in an operative position when the frame members are oriented perpendicularly to each other, and in a stored position when the frame members are folded side by side, and having handles releasably mountable to the frame for manipulation of the cart on the wheel.

It is by virtue of the foregoing basic concept that the principal objective of this invention is achieved; namely, to overcome the aforementioned disadvantages and limitations of collapsible pack carts of the prior art.

Another object of this invention is to provide such a collapsible pack cart which is assembled and collapsed easily.

Another object of this invention is to provide such a collapsible pack cart wherein all the elements are tied together into a compact unit when the cart is collapsed.

Another object of this invention is to provide such a collapsible pack cart having brake means for operation on steep terrain.

A further object of this invention is to provide such a collapsible pack cart having means for two-man operation on steep terrain.

A still further object of this invention is to provide such a collapsible pack cart which is of simplified construction for economical manufacture and is of rugged, unitary design permitting severe treatment in use.

The aforegoing and other objects and advantages of this invention will appear from the following detailed description, taken in connection with the accompanying drawings of a preferred embodiment.

BRIEF DESCRIPTION OF THE DRAWINGS

FIG. 2 is a perspective view showing the frame members of the cart of FIG. 1.

FIG. 3 is a fragmentary, exploded detailed view showing a portion of the frame members of FIG. 2.

FIG. 8 is a sectional view taken on the line 8—8 of FIG. 2.

DETAILED DESCRIPTION OF A PREFERRED EMBODIMENT

Figure 1:
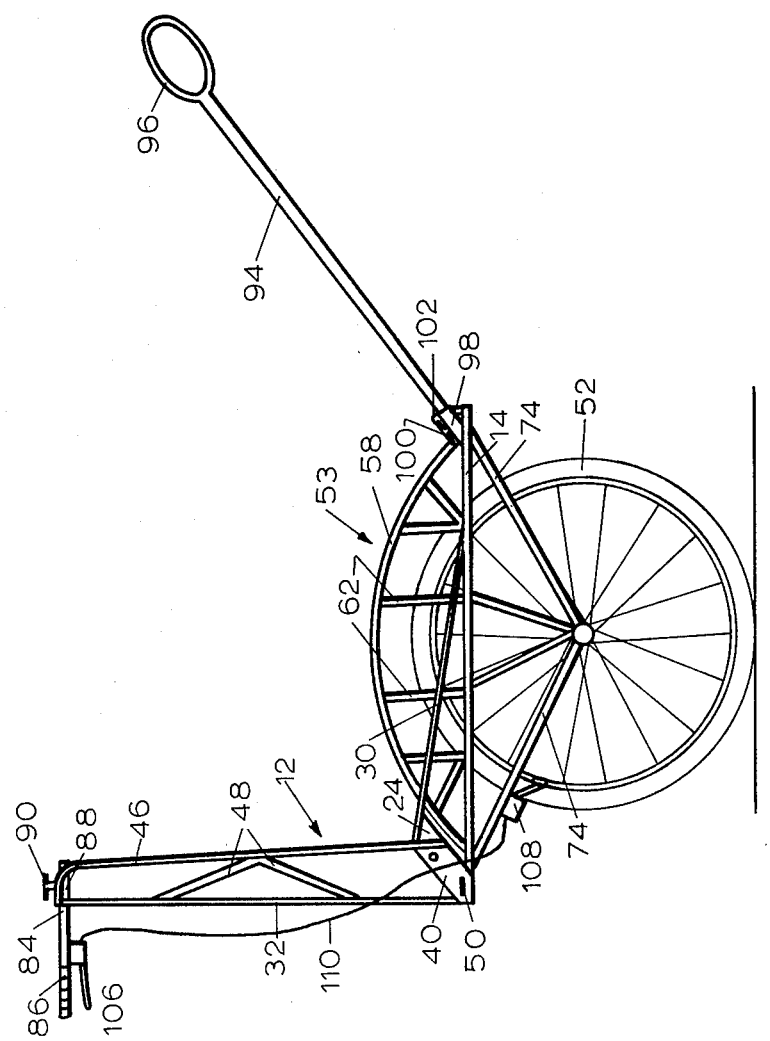
FIG. 1 is a view in side elevation showing the pack cart of the present invention in its operating position.

Referring to FIGS. 1 and 2 of the drawings, the pack cart of the present invention includes a first frame member, such as base 10, and a second frame member, such as upright 12, which cooperate to support the other elements of the cart. The frame members generally are constructed from tubular components and are joined pivotally together.

The base is rectangular and includes a U-shaped tubular peripheral element 14 having legs which are interconnected by a rectangular end bar 16. Spaced apart, hollow, rectangular cross sectioned wheel supports 13 extend longitudinally across the base between the peripheral element and the end bar. Elongated stiffener rods 20 are located in the base outwardly parallel of the wheel supports adding stiffness, and zig-zag webs 22 interconnect the peripheral element, the wheel supports and the stiffener rods into an integral unit.

Joined to the legs of the peripheral element and the end bar at their points of intersection are first pivot plates 24. They comprise forwardly angled flat plates having upper bores 26 extending through their upper portions, and lower bores 27 having nuts 28 joined coaxially therewith in their lower portions. Tubular side elements 30 diagonally interconnect the upper margins of the first pivot plates with the peripheral element 14.

The upright 11 has a length which is the same as that of the base and a width which is slightly larger. It includes paired sides 32 separated by paired ends 34. A stiffener 36 medially interconnects the ends, and zig-zag webs 38 interconnect the sides and the stiffener.

Second pivot plates 40 are joined to both extremities of one of the ends 34 and the adjacent extremities of the sides 32. They comprise forwardly angled flat plates having inwardly facing pins 42 in their upper portions and having bores 44 passing through their lower portions. L-shaped rails 46 interconnecting the upper margins of the second pivot plates 40 and the end 34 are stiffened by diagonal rods 48. All of the elements of the frame members are integrally joined, such as by welding.

The pivot plates are arranged so that the second pivot plates 40 fit outwardly adjacent to the first pivot plates 24 and pins 42 fit into bores 26 when the frame members are placed end to end with end bar 16 located adjacent to end 34. Thus the upright is pivotable with respect to the base between an operating position, FIG. 2, wherein they are perpendicular to each other, and a folded position, FIG. 4, wherein they are oriented side by side and separated by a spaced distance. When they are in their folded position it will be noted that side elements 30, rails 46 and diagonal rods 48 cooperate to enclose the side openings between the frame members.

The bores 44 in the second pivot plates are in alignment with the nuts 28 which are attached to the first pivot plates when the frames are in their operating position. Locking means, such as T-handled latching bolts 50 having threaded extremities, extend through bores 44 into threaded engagement with nuts 28 locking the cart in its operation position.

Figure 6:
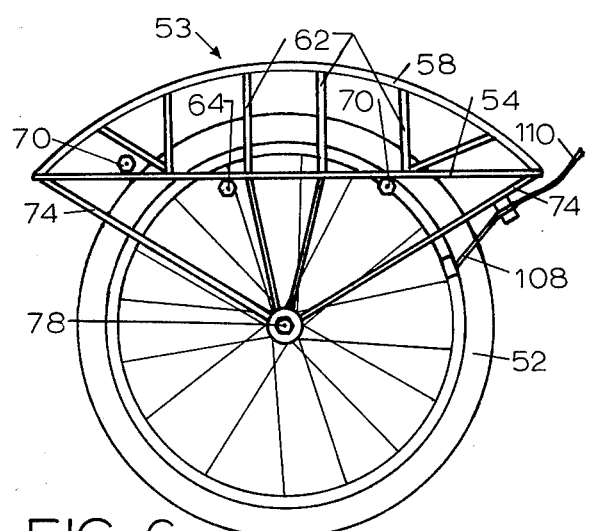
FIG. 6 is a view in side elevation of the wheel and carriage of the cart of FIG. 1.
Figure 7:
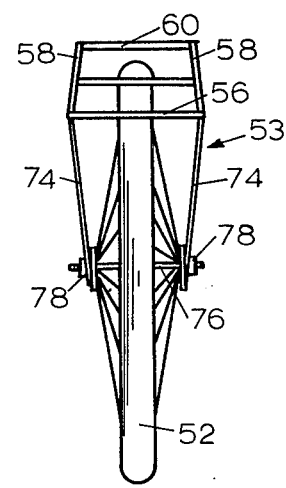
FIG. 7 is a view in end elevation of the wheel and carriage of FIG. 6.

A wheel 52, best shown in FIGS. 6 and 7 and preferably of the type commonly used in bicycles, is mounted rotatably in a carriage 53 for supporting the frame members. The carriage comprises spaced apart sides 54, having the same length as wheel supports 18, which are interconnected at each of their extremities by ends 56. The sides are separated by a distance sufficient for fitting the carriage into the base in an operative position between the wheel supports 18. Joined to the extremities of the sides are arcuate top elements 58 which are interconnected at spaced intervals by spacers 60. Rails 62 interconnect the top elements and the sides 54 at spaced intervals.

Locating tabs 60, FIG. 8, having downwardly facing terminal portions 82, face inwardly from joinder with each wheel support 18 and from peripheral element 14 and end bar 16 for engaging the carriage. Thus when the carriage is located in the base it is prevented from moving upwardly past its operative position.

Nuts 64, joined to both sides 54 intermediate their ends, are arranged to be in alignment with openings 66 which pass through the wheel supports 18. T-handled latching bolts 68 having threaded extremities, pass through openings 66 into threaded engagement with nuts 64, securing the carriage in its operative position in the frame element.

Nuts 70 are located at each end of one of the sides 54 of the carriage. They are arranged to be in alignment with openings in tabs 72, which are attached to webs 38 of the upright, when the carriage is placed in a storable position adjacent to the inside of the upright. Latching bolts 68 are placed through the openings in tabs 72 into threaded engagement with nuts 70 for securing the carriage to the upright in its storable position.

Arms 74 extending diagonally from each end of each side 54 of the carriage are arranged to carry an axle 76 which journals wheels 52. Nuts 78 secure the axle in the arms.

Handles 84 are joined releasably to the upright in a manner for manipulation of the cart on the wheel. In the embodiment illustrated the handles include lengths of box beam having rounded grips 86 at their terminal extremities. Holders 88 comprising short segments of box beam configured for sliding fits over the handles are attached to the uprights. T-shaped pins 90 fit through aligned openings in the handles and holders for fixing the handles in the holders. Chains 92 interconnect the pins and the holders preventing their loss when the handles are removed.

Elongated support arms 94 having looped handles 96 at their extremities are joined releasably to the base in a manner for aiding transportation of the cart on an inclined surface. The support arms are fabricated from box beams similar to handles 84 and fit into holders 98 which are shaped similarly to holders 88. The holders 98 are joined to the frame adjacent to the wheel supports 18 and angle upwardly and forwardly. T-shaped pins 100, tied to the holders by chains 102, fit through openings in the support arms and their holders for fixing the support arms therein.

Attached to the frame members at selected locations are inwardly facing cleats 104. Rope for securing articles in the cart can be wrapped around the cleats facilitating anchoring the articles to the frame.

Brakes for controlling the speed of the cart comprise squeeze type actuation means 106 which is located on one of the handles. A caliper type releasably clamping brake 108, of the type commonly used on bicycles, is mounted on one of the diagonal arms 74 adjacent to the wheel in a manner for engagement of the brake shoes against the wheel. The actuation means and brake are interconnected by a flexible cable 110.

Means are provided for attaching the handles 84 and the support arms 94 releasably to the upright. Thus when the frame elements are in their folded position, the handles and support arms are located contiguous therewith for ease of transportation. To this end, nuts 112 are attached on each of the diagonal rods 48 on one side of the upright. C-shaped clamps 114, having medial openings, are arranged for fitting over the handles and support arms, and latching bolts 50 fit through the openings therein into threaded engagement with nuts 112.

OPERATION

Figure 4:
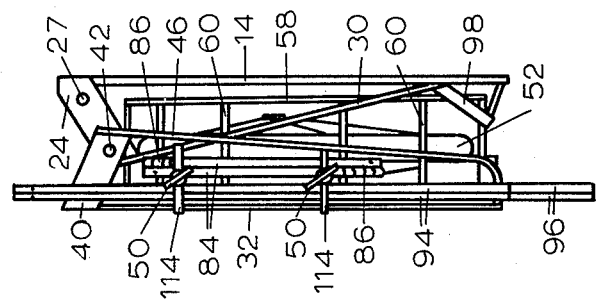
FIG. 4 is a plan view of the cart in its folded position.
Figure 5:
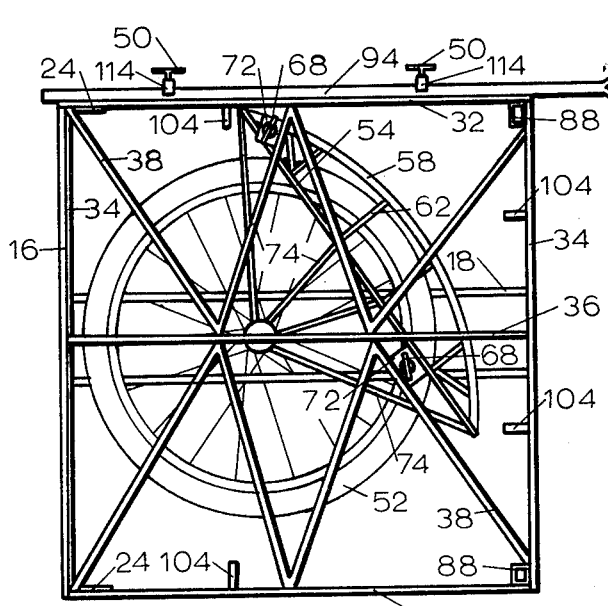
FIG. 5 is a view in side elevation of the cart in its folded position.
Figure 9:
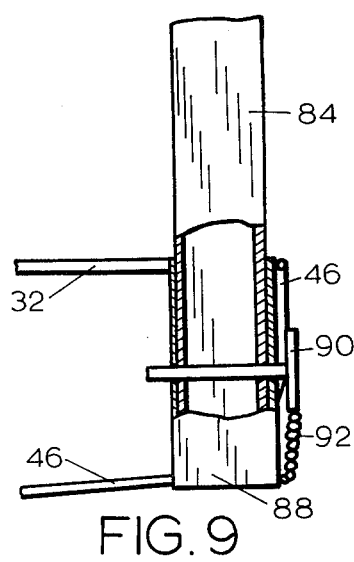
FIG. 9 is a detailed view in side elevation, partially broken away, showing a portion of the cart of FIG. 1.

In the operation of the pack cart of the present invention, it is transported in its folded position, FIGS. 4 and 5, to the site where it will be used. In this configuration carriage 53 is attached to the inside of upright 12 by latching bolts 68 which pass through tabs 72 into engagement with nuts 70. The frame members 10 and 12 are in their folded position with the wheel and carriage located within the cavity formed between them. Handles 84 and support arms 94 are mounted on the upright by means of clamps 114 and latching bolts 50 which are engaged by nuts 112. A strap may be positioned around the frame elements to maintain them in their folded position.

To place the cart in its operating position the upright 12 is rotated on pin 42 to a position which is normal to the base 10. Locking bolts 50 are removed from nuts 112 and placed through openings 44 in the second pivot plates 40 into threaded engagement with nuts 28 in the first pivot plates 24 locking the frame members in their operating position. As a result handles 84 and support arms 94 are released for positioning in holders 88 and 98 respectively. Pins 90 and 100 are inserted through the openings in their associated holders to secure these elements in place. It will be noted that one of the handles is attached to cable 110 through actuation means 106 and must be manipulated accordingly during insertion into its respective holder 88.

The wheel 52 and carriage 53 then are removed from the upright by removing latching bolts 68 from nuts 70, and the carriage is inserted into the opening in the base between wheel supports 18. Locating tabs 80 position the carriage in the base allowing insertion of latching bolts 68 through openings 66 into threaded engagement with nuts 64. Thus the carriage is fixed into the base in its operation position.

The cart now is ready for use and may be manipulated by handles 84 similar to a wheelbarrow with the base substantially parallel with the ground. Thus a load may be placed on the base for transporting. If the load is tied down with rope, cleats 104 aid in attaching the rope to the base.

When sloped terrain is encountered, a second person walking in front of the cart can pull or retard movement by gripping the support arms 94. Also in sloped terrain the brakes will help the operator in manipulation of the cart.

After transportation of the load the card can again be placed in its folded position by reversing the above procedure. In this position it readily can be placed in the trunk of an automobile.

Having thus described my invention and the method in which it may be used, I claim:

1. A collapsible pack cart comprising:

(a) a first frame member, having inner and outer sides;

(b) a second frame member, having inner and outer sides, pivotally joined to said first frame member along adjacent transverse edges thereof, and movable with respect to said first frame member between an operating position wherein said frame members are oriented substantially perpendicular to each other, and a folded position wherein said frame members are positioned adjacent to one another with their respective inner sides facing one another, and separated by a space distance;

(c) spaced apart, paired wheel supports extending longitudinally medially across said second frame member defining a medial wheel receiving opening therebetween;

(d) a wheel, and a carriage rotatably mounting said wheel, said carriage arranged to freely fit within said medial wheel receiving opening in an operated position such that the wheel partially extends therefrom substantially perpendicular to the plane of both said frame members when they are in their operating position;

(e) said carriage having paired sides, which are substantially coextensive with said wheel supports and spaced apart so as to lie inwardly adjacent the respective wheel supports when said carriage is in its operative position, and paired ends interconnecting the extremities of said sides;

(f) locating tabs mounted on said second frame member at spaced intervals about the periphery of said wheel receiving opening, said tabs being positioned in a manner to engage each of said sides and said ends of said carriage when it is in its operative position so as to prevent it from being displaced further toward the inner side of said second frame member;

(g) locking means associated with said second frame member and said carriage for securing said carriage in its operative position; and (h) retention means associated with said first frame member and said carriage for releasable attachment of said carriage to said first frame member in a storable position so that it is located entirely between said frame members when they are in their folded position.

2. The pack cart of claim 1 wherein said locking means comprises:

(a) bores passing through said wheel supports;

(b) nuts joined to said carriage in a manner to be aligned with said bores when said carriage is in its operative position; and (c) threaded fasteners arranged to pass through said bores into engagement with said nuts.

3. The pack cart of claim 1 wherein said retention means comprises:

(a) nuts joined to said carriage;

(b) tabs having central openings passing therethrough located on said first frame member so that said openings are in alignment with said nuts when said carriage is in its storable position; and (c) threaded fasteners arranged to fit through said openings into engagement with said nuts.

4. The pack cart of claim 1 including handles releasably joined to said first frame member and arranged for permitting manipulation of the cart on said wheel with said second frame member being oriented substantially parallel to the ground.

5. The pack cart of claim 4 including paired rigid support arms releasably joined to said second frame member and arranged to angle upwardly from said frame member and away from said first frame member in a manner for aiding transport of the cart on an inclined surface.

6. The pack cart of claim 5 including mounting means arranged for mounting said handles and said support arms releasably to one of said frame member substantially contiguous therewith when said frame members are in their folded position.

7. The pack cart of claim 1 wherein said frame members are interconnected by hinge means comprising:

(a) paired diagonal first pivot plates joined to opposite transverse corners of said second frame member;

(b) said first pivot plates having lower bores, with nuts attached inwardly adjacent thereto, and upper bores passing respectively therethrough;

(c) paired diagonal second pivot plates joined to opposite transverse corners of said first frame members and arranged to be located inwardly adjacent to respective ones of said first pivot plates when said frame members are in their operating position;

(d) said second pivot plates having lower openings passing therethrough in alignment with said lower bores in said first pivot plates;

(e) said second pivot plates having inwardly extending pivot pins arranged to pivotally fit within said upper bores in said first pivot plates; and (f) fasteners arranged to fit through said lower openings in said second pivot plates and said lower bores in said first pivot plates into engagement with said nuts.

* * * * *

UNITED STATES PATENT AND TRADEMARK OFFICE
CERTIFICATE OF CORRECTION

PATENT NO. : 4,171,139
DATED : October 16, 1979
INVENTOR(S) : COCKRAM, Freeman

It is certified that error appears in the above-identified patent and that said Letters Patent are hereby corrected as shown below:

Col. 1, Line 10     After "storage" insert the word --and--.

Col. 2, Line 20     Change "13" to --18--;

Line 37     Change "11" to --12--.

Signed and Sealed this

Ninth Day of December 1980

[SEAL]

Attest:

SIDNEY A. DIAMOND

Attesting Officer     Commissioner of Patents and Trademarks